US012761113B2

(12) United States Patent
Zaky et al.

(10) Patent No.: US 12,761,113 B2
(45) Date of Patent: Oct. 13, 2026

(54) IDENTIFYING LENS CHARACTERISTICS USING REFLECTIONS

(71) Applicant: APPLE INC., Cupertino, CA (US)

(72) Inventors: Zeyad Zaky, Mountain View, CA (US); Hua Gao, San Jose, CA (US); Marvin Klinkhardt, Berlin (DE); Tom Sengelaub, Oakland, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 18/692,353

(22) PCT Filed: Sep. 19, 2022

(86) PCT No.: PCT/US2022/043959
§ 371 (c)(1),
(2) Date: Mar. 15, 2024

(87) PCT Pub. No.: WO2023/049066
PCT Pub. Date: Mar. 30, 2023

(65) Prior Publication Data

US 2024/0393207 A1 Nov. 28, 2024

Related U.S. Application Data

(60) Provisional application No. 63/248,252, filed on Sep. 24, 2021.

(51) Int. Cl.
*G01M 11/02* (2006.01)

(52) U.S. Cl.
CPC .... *G01M 11/0285* (2013.01); *G01M 11/0207* (2013.01)

(58) Field of Classification Search
CPC ......... G01M 11/0285; G01M 11/0207; G01M 11/0214; G01M 11/0221; G01M 11/0228;
(Continued)

(56) References Cited

U.S. PATENT DOCUMENTS 5,719,668 A * 2/1998 Oana .................... G01B 11/255 356/127
7,209,224 B2 * 4/2007 Kajino ............... G01M 11/0228 356/124

(Continued)

FOREIGN PATENT DOCUMENTS

CN 101901328 A 12/2010
CN 107787473 A 3/2018

(Continued)

OTHER PUBLICATIONS

European Patent Office (ISA/EP), International Search Report and Written Opinion of the International Searching Authority, International Application No. PCT/US2022/043959, 11 pages, Dec. 13, 2022.

(Continued)

*Primary Examiner* — Seung C Sohn
(74) *Attorney, Agent, or Firm* — Thompson Hine LLP

(57) ABSTRACT

Various implementations disclosed herein include devices, systems, and methods that determine a lens characteristic of an attachable lens using reflections. In some implementations, a method can include producing a pattern of light using an arrangement of light sources. Then, reflections are detected in an image obtained via an image sensor, the reflections corresponding to light from each of a plurality of the light sources reflecting from a surface of an attachable lens. In some implementations, a lens characteristic of the attachable lens is determined based on the detected reflections and a 3D spatial relationship between the image sensor and the plurality of the light sources. In some implementations, the lens characteristic is a prescription, and content is provided at the electronic device based on the prescription, where the content is viewable through the attachable lens.

20 Claims, 9 Drawing Sheets

(58) Field of Classification Search
CPC ........... G01M 11/0264; G02B 27/0172; G02B 27/0093
See application file for complete search history.

(56) References Cited

U.S. PATENT DOCUMENTS

| | | | |
|---|---|---|---|
| 8,430,310 | B1 | 4/2013 | Ho |
| 8,976,250 | B2 | 3/2015 | Armstrong-Muntner |
| 9,454,251 | B1 | 9/2016 | Guihot |
| 9,507,974 | B1 | 11/2016 | Todeschini |
| 9,536,355 | B1 | 1/2017 | Kumar |
| 10,409,076 | B2 | 9/2019 | Tremblay |
| 10,437,071 | B2 | 10/2019 | Tremblay |
| 11,025,892 | B1 | 6/2021 | Aman |
| 11,445,166 | B2 | 9/2022 | Nemoto |
| 2004/0217173 | A1 | 11/2004 | Lizotte |
| 2006/0176167 | A1 | 8/2006 | Dohrmann |
| 2008/0128492 | A1 | 6/2008 | Roth |
| 2009/0134227 | A1 | 5/2009 | Roth |
| 2009/0166427 | A1 | 7/2009 | Chambers |
| 2009/0212109 | A1 | 8/2009 | Harttig |
| 2010/0301119 | A1 | 12/2010 | Maeda |
| 2011/0157203 | A1 | 6/2011 | Tsai |
| 2012/0013580 | A1 | 1/2012 | Lin |
| 2012/0019645 | A1 | 1/2012 | Maltz |
| 2012/0068976 | A1 | 3/2012 | Chang |
| 2012/0262451 | A1 | 10/2012 | Kotani |
| 2014/0263612 | A1 | 9/2014 | Warren |
| 2014/0282646 | A1 | 9/2014 | Mccoy |
| 2014/0339296 | A1 | 11/2014 | Mcadams |
| 2015/0212316 | A1 | 7/2015 | Krishnan |
| 2016/0033772 | A1 | 2/2016 | Han |
| 2016/0353988 | A1 | 12/2016 | Moller |
| 2017/0031435 | A1 | 2/2017 | Raffle |
| 2017/0132806 | A1 | 5/2017 | Balachandreswaran |
| 2017/0300926 | A1 | 10/2017 | Stout |
| 2017/0358256 | A1 | 12/2017 | Ross |
| 2018/0053050 | A1 | 2/2018 | Kingsbury |
| 2018/0157043 | A1 | 6/2018 | Yi |
| 2018/0164535 | A1 * | 6/2018 | Brown ..................... G02B 7/04 |
| 2019/0041644 | A1 | 2/2019 | Abele |
| 2019/0250408 | A1 | 8/2019 | Lafon |
| 2019/0258442 | A1 | 8/2019 | Hudman |
| 2020/0033560 | A1 | 1/2020 | Weber |
| 2020/0050824 | A1 | 2/2020 | Held |
| 2020/0096775 | A1 | 3/2020 | Franklin |
| 2020/0158497 | A1 | 5/2020 | Arnoult |
| 2020/0174284 | A1 | 6/2020 | Chan |
| 2020/0400948 | A1 | 12/2020 | Maric |
| 2021/0053160 | A1 | 2/2021 | Qiao |
| 2021/0128408 | A1 | 5/2021 | Sohr |
| 2021/0169417 | A1 | 6/2021 | Burton |
| 2021/0302745 | A1 | 9/2021 | Mutlu |
| 2022/0318551 | A1 | 10/2022 | St Amant |
| 2022/0391608 | A1 | 12/2022 | Kurz |
| 2023/0031613 | A1 | 2/2023 | Fleury |
| 2023/0094600 | A1 | 3/2023 | Liu |
| 2023/0218159 | A1 | 7/2023 | Eadie |
| 2023/0264442 | A1 | 8/2023 | Mirabella |
| 2023/0417627 | A1 * | 12/2023 | Rathi ................. G01M 11/0221 |
| 2024/0000312 | A1 | 1/2024 | Bazin |
| 2024/0020371 | A1 | 1/2024 | Dedonato |
| 2024/0028110 | A1 | 1/2024 | Mori |
| 2024/0028114 | A1 | 1/2024 | Cockram |
| 2024/0031551 | A1 | 1/2024 | Mori |
| 2024/0036327 | A1 | 2/2024 | Nishibe |

FOREIGN PATENT DOCUMENTS

| | | | |
|---|---|---|---|
| CN | 110716639 | A | 1/2020 |
| CN | 111148639 | A | 5/2020 |
| CN | 112513715 | A | 3/2021 |
| EP | 3405767 | B1 | 11/2018 |
| KR | 1020210025093 | A | 3/2021 |
| WO | 2017/125902 | A1 | 7/2017 |
| WO | 2021140204 | A1 | 7/2021 |

OTHER PUBLICATIONS

Intellectual Property India, Examination Report under Sections 12 & 13 of the Patent Act issued in Indian Patent Application No. 202417018738 dated May 13, 2026 with English translation (Eight (8) pages).

* cited by examiner

IDENTIFYING LENS CHARACTERISTICS USING REFLECTIONS

CROSS-REFERENCE TO RELATED APPLICATIONS

This patent application is the national stage of International Application No. PCT/US2022/043959 (International Publication No. WO 2023/049066) filed on Sep. 19, 2022, which claims the benefit of U.S. Provisional Application No. 63/248,252 filed on Sep. 24, 2021, "IDENTIFYING LENS CHARACTERISTICS USING REFLECTIONS," each of which is incorporated herein by this reference in its entirety.

TECHNICAL FIELD

The present disclosure generally relates to electronic devices such as head-mounted devices (HMDs) that may be used with attachable lenses.

BACKGROUND

People sometimes need prescription eyeglasses to see clearly, but wearing eyeglasses in HMDs may be uncomfortable.

SUMMARY

Various implementations disclosed herein include devices, systems, and methods that determine a lens characteristic of an attachable lens of an electronic device based on reflected light patterns. For example, the attachable lens may be a corrective prescription lens insert for an HMD and the lens characteristic may be a set of prescription parameters of the attachable lens. In some implementations, the reflected light patterns can be produced by light emitted from a plurality of light sources and reflected off a front and/or back surface of the attachable lens. An image sensor can then capture an image containing the reflections of light and the image may be used to identify the prescription of the attachable lens. Different prescriptions of attached lenses, or diopters (a unit of measurement of the optical power of a lens), may generate distinct arrangements of the reflections. Thus, in some implementations, the prescription of the attachable lens can be determined based on a spatial positioning of a pattern of the reflections of light. The determined prescription can be used to correctly display content by the electronic device. In some implementations, the image sensor and the plurality of light sources are the same image sensor and light sources used for eye/gaze tracking at the electronic device. In some implementations, the reflections are not visible to a user of the electronic device due to their wavelength being outside of the visible light spectrum.

In one implementation, a sequence of images is obtained from an image sensor. Each of the images depicts reflections of light produced by a plurality of light sources and reflected off a surface of an attachable lens. The images may be used to detect that the attachable lens has been/is present at an electronic device, a position of the attachable lens, and/or a diopter (e.g., prescription) of the attachable lens. The diopter of the attached attachable lens may be determined based on a pattern of the reflections (e.g., patterns of reflections caused by the front surface and/or the back surface of the attachable lens).

In general, one innovative aspect of the subject matter described in this specification can be embodied in methods that include the actions of producing a pattern of light using an arrangement of light sources. In some implementations, reflections are detected in an image obtained via an image sensor, the reflections corresponding to light from each of a plurality of the light sources reflecting from a surface of an attachable lens. Then, a lens characteristic of the attachable lens is determined based on the detected reflections and a 3D spatial relationship between the image sensor and the light sources.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
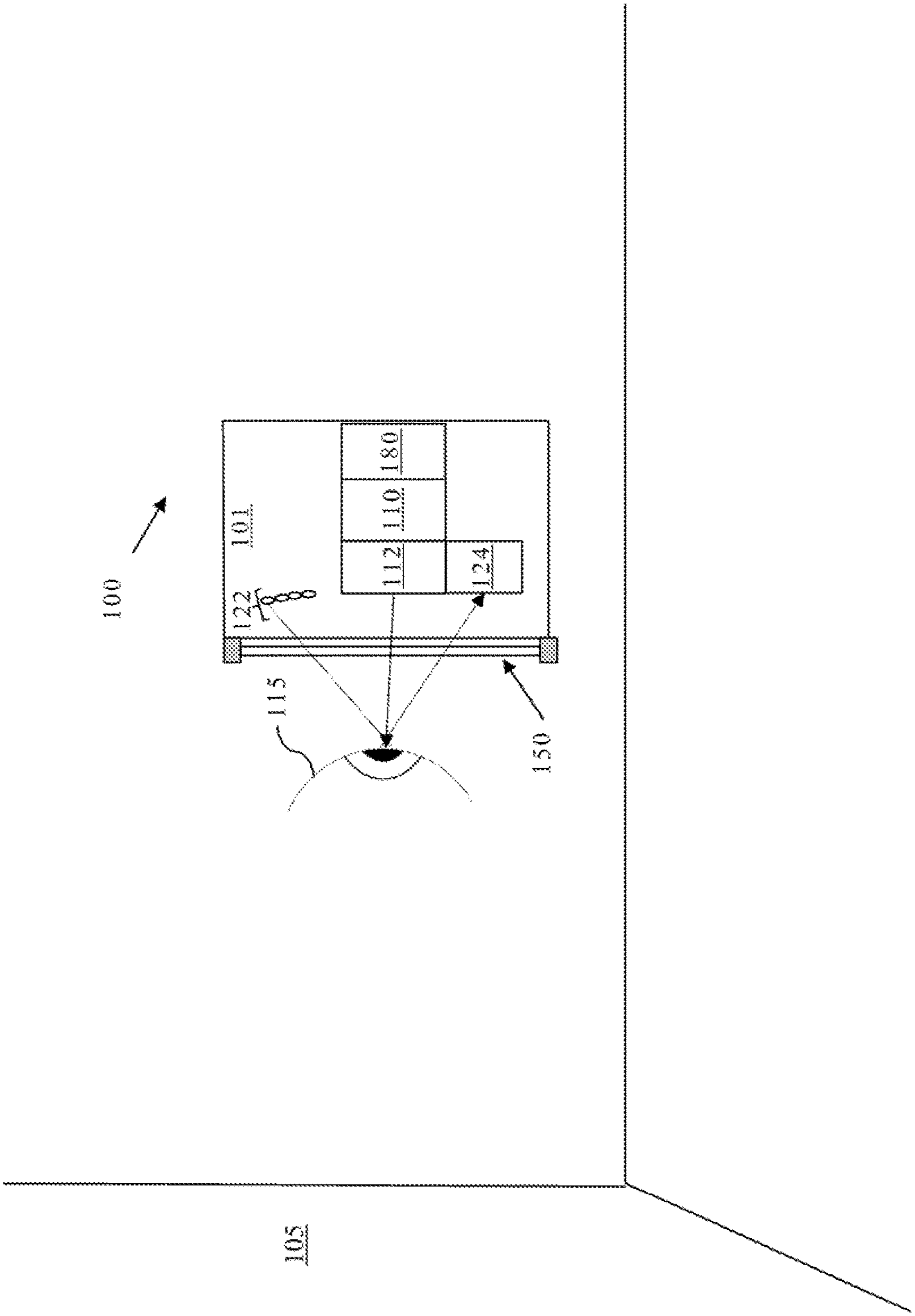
FIG. 1 illustrates a diagram of an exemplary electronic device in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that determine a lens characteristic (e.g., prescription/position/orientation) of an attachable lens using reflections. In some implementations, an image sensor captures an image of the attachable lens including reflections caused by light being reflected from a front surface and/or a back surface of the attachable lens. The light may be produced by a plurality of light sources (e.g., a spatial arrangement of LEDs). Different diopters (e.g., prescriptions) of the attachable lens will result in distinct arrangements of the reflections. Accordingly, the arrangement of reflections captured by one or more images of a given lens may be used to determine the diopter (e.g., prescription) of the lens.

FIG. 1 is a diagram of an exemplary electronic device 100. The electronic device 100 includes a housing 101 (or enclosure) that houses various components. In some implementations, the electronic device 100 is a head-mounted device (HMD) and the housing 101 is configured to rest against a face of a user 115 to keeps the electronic device 100 in a relatively fixed position on the face of the user 115 (e.g., surrounding the eyes of the user 115). The housing 101 houses a display 110 that displays an image, emitting light towards or onto the eye of the user 115. In various implementations, the display 110 emits the light through an eyepiece having one or more lenses 112 that refracts the light emitted by the display 110, making the display appear to the user 115 to be at a virtual distance farther than the actual distance from the eye to the display 110. For the user 115 to focus on the display 110, in various implementations, the virtual distance is at least greater than a minimum focal distance of the eye (e.g., 7 cm). Further, in order to provide a better user experience, in some implementations, the virtual distance is greater than 1 meter.

The housing 101 also houses a tracking system including one or more light sources 122, image sensor 124, and a controller 180. The one or more light sources 122 emit light onto the eye of the user 115 that reflects as a light pattern (e.g., one or more glints such as a circle) that can be detected by the image sensor 124 (e.g., camera). Based on the light pattern, the controller 180 can determine an eye tracking characteristic of the user 115. For example, the controller 180 can determine a gaze direction of one or both eyes of the user 115. In another example, the controller 180 can determine a blinking state (eyes open or eyes closed) of the user 115. As yet another example, the controller 180 can determine saccadic movements, a pupil center, a pupil size, or a point of regard. In some implementations, the light from the eye of the user 115 is reflected off a mirror or passed through optics such as lenses or an eyepiece before reaching the image sensor 124.

In some implementations, the display 110 emits light in a first wavelength range, the one or more light sources 122 emit light in a second wavelength range, and the image sensor 124 detects light in the second wavelength range. In some implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm), or any other wavelength range outside of the visible light wavelength range. In some implementations, the light source 122 and the image sensor 124 use overlapping wavelengths when illuminating the eye for eye/gaze tracking. Alternatively, the light source 122 and the image sensor 124 use the same spectrum to illuminate the eye for eye/gaze tracking, while the user 115 is looking at the display 110 showing content using the visible spectrum.

As shown in FIG. 1, a lens 150 can be removably or permanently attached to the electronic device 100. In some implementations, the lens 150 is attached using the housing 101 of the electronic device 100. Lens 150 can be any suitable transparent lens for altering a perception of the display 110 by user's eyes. For instance, lens 150 can be a corrective lens that has a diopter, e.g., prescription, for correcting the user's vision. In such configurations, the lens 150 can help the user 115 to accurately see the display 110. However, for the electronic device 100 to accurately provide content for the user 115, the electronic device 100 needs to know the prescription (or other information) about the lens 150. One way for the electronic device 100 to access information about the one or more lens 150 is to detect reflections of the one or more light sources 122 caused by a first surface (e.g., front surface) and/or a second surface (e.g., back surface) of the lens 150. In some implementations, the reflections of the one or more light sources 122 caused by the lens 150 are detected using a sensor in the electronic device 100 such as the image sensor 124. For example, the reflections of the one or more light sources 122 caused by lens surfaces can be captured by the image sensor 124 and the information contained therein can be decoded by the controller 180 and used to modify operations of the electronic device 100, as will be discussed herein with respect to FIG. 2.

In some implementations, the light sources 122 create light that reflects off the front surface and/or the back surface of the lens 150. The light sources 122 may be LEDs. In some implementations, a pattern of reflections off the lens is detected in one or more images taken by the image sensor 124 when the eye tracking functionality is not being used. In one implementation, the pattern of reflections off the lens is detected when eye tracking is enabled and content is displayed (or not displayed) in a specific area of the display 110.

In various implementations, the image sensor 124 is a frame/shutter-based camera that, at a particular point in time or multiple points in time at a frame rate, generates an image of the eye of the user 115. Each image includes a matrix of pixel values corresponding to pixels of the image which correspond to locations of a matrix of light sensors of the camera.

In some implementations, the image sensor 124 has a single field of view (FOV) that is used for both eye tracking functionality and detection of the lens characteristic on the lens 150. In other implementations, the image sensor 124 has multiple FOVs with differing parameters such as size, magnification, or orientation with respect to the lens 150. The image sensor may have a first FOV used for eye tracking and a second, different FOV used for detection of the lens characteristic of the lens 150.

Figure 2:
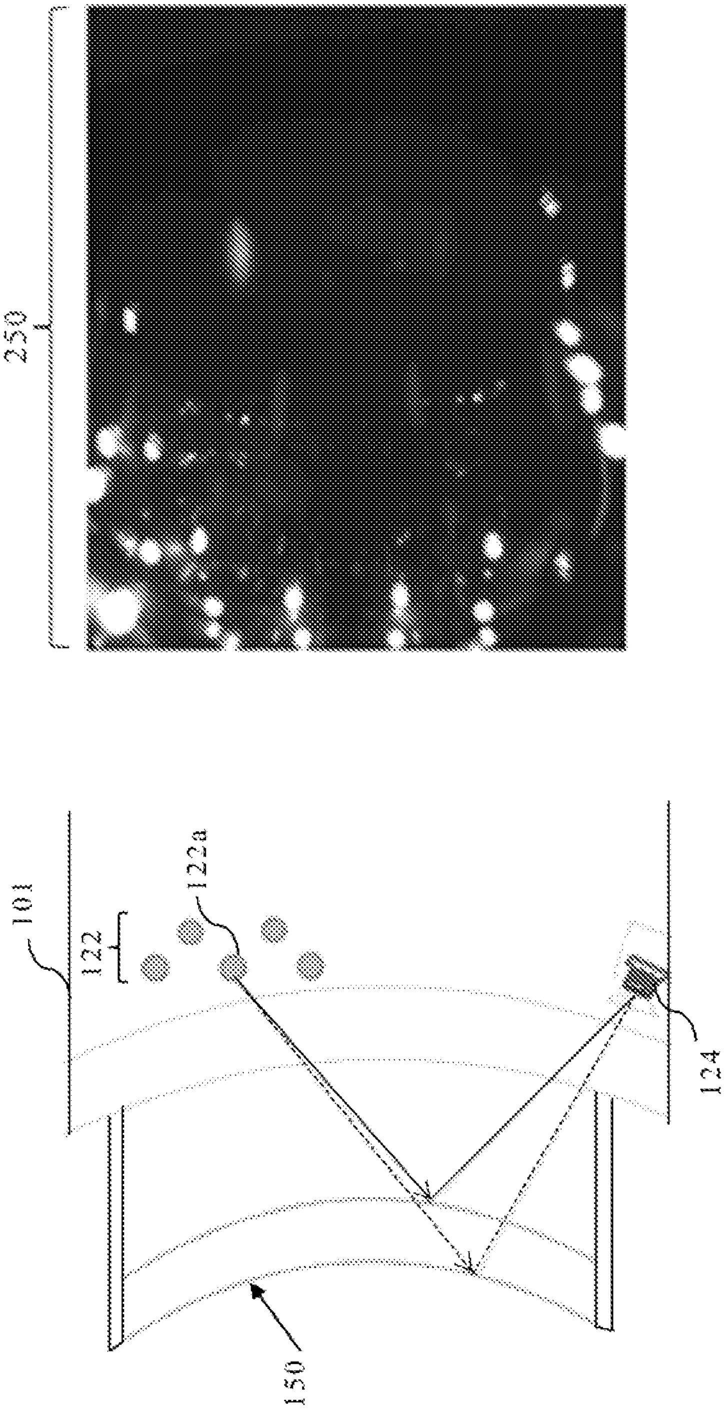
FIG. 2 is a diagram that shows exemplary reflections of light reflecting from a surface of an attachable lens in accordance with some implementations.

FIG. 2 is a diagram that shows an example image 250 including reflections of light sources 122 off the lens 150, including reflections off a front surface 152 and a back surface 154 of the lens 150. Pairs of reflections off the front surface 152 and the back surface 154 of the lens 150 are detectable in the image 250 captured by the image sensor 124. For example, reflection 220-1*a* and reflection 220-1*b* form a pair of reflections 220-1 that correspond to a single light source. Pairs of reflections corresponding to a single light source may be detected based on their spatial relationship (e.g., nearness) to one another in the image 250.

FIG. 2 also illustrates a light path 240 for light from an example light source 122*a* being reflected from the front surface 152 of the lens 150 to the image sensor 124. This light path 240 is shown as a solid line. A light path 250 for light from the example light source 122*a* being reflected from the back surface 152 of the lens 150 to the image sensor 124 is shown as a dashed line.

In some implementations, a pattern of the reflections of the light sources 122 caused by the lens 150 in the image 250 captured by the image sensor 124 is used to determine a characteristic of the lens 150 used by the electronic device 100. For example, the pattern of the reflections in the image 250 may be used to determine the prescription parameters (e.g., nearsighted, farsighted, diopter, etc.) of the lens 150. The pattern of the reflections of the light sources 122 may additionally or alternatively be used to determine a position or orientation (e.g., 3D position and 3 orientations) of the lens 150 in the electronic device 100.

Figure 3:
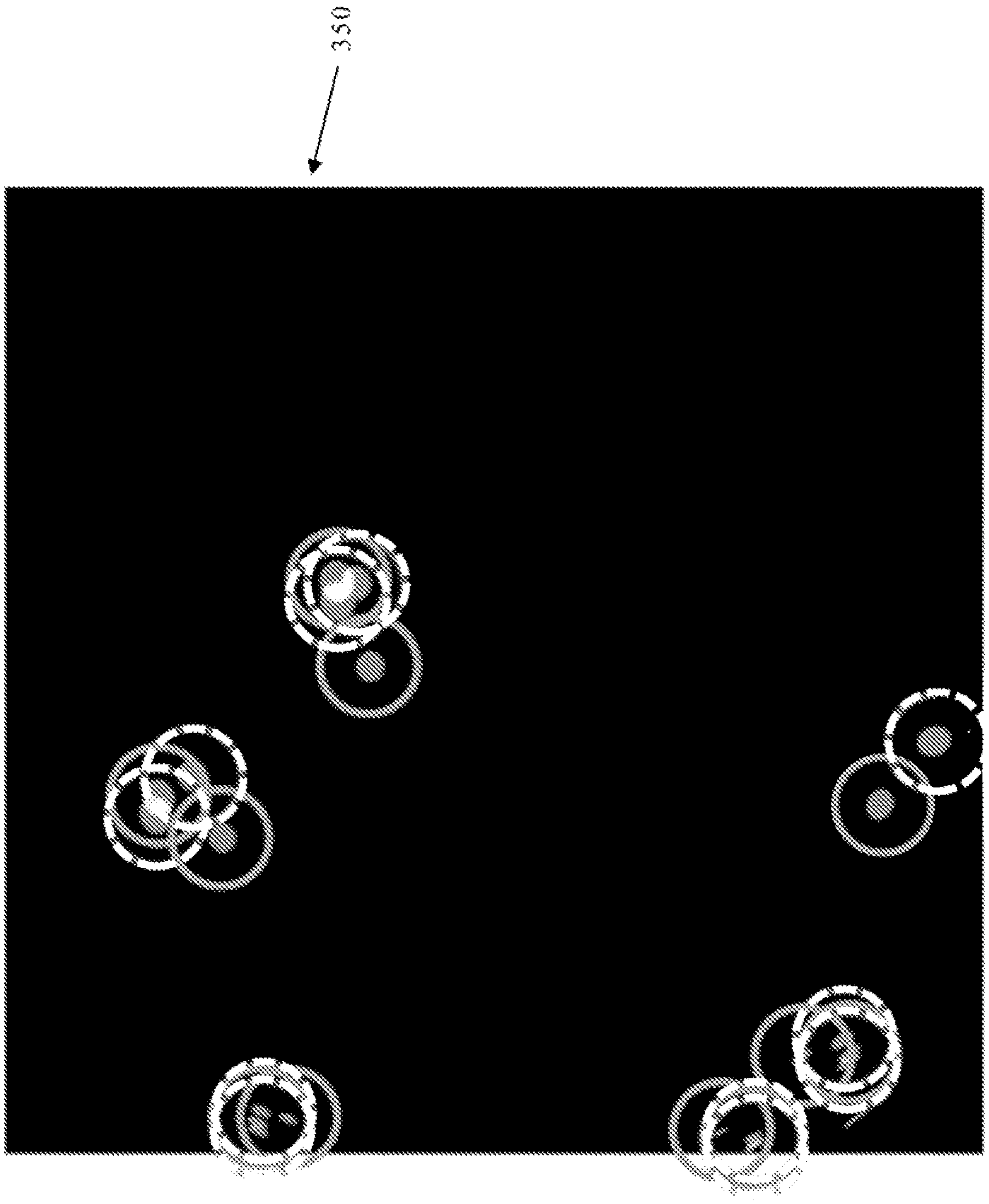
FIG. 3 is a diagram that shows an example image including reflections of light sources caused by an attachable lens in accordance with some implementations.

FIG. 3 is a diagram that shows an example image 350, including reflections of light sources off a lens. A pattern of 9 pairs of reflections 320-1, 320-2, . . . , 320-9 caused by 9 light sources 122 are captured in a portion of an image 350 from the image sensor 124. Reflections 320-1*b*, 320-2*b*, . . . , 320-9*b* from the back surface of the lens 150 are inside (e.g., at the center of) dashed circles and reflections 320-1*a*, 320-2*a*, . . . , 320-9*a* from the front surface of the lens 150 are inside (e.g., at the center of) solid circles to highlight the pattern of reflections. The pattern of the reflections depends upon the diopter of the lens 150, characteristics of the light sources 122, and the 3D spatial arrangement between the light sources 122, the lens 150, and the image sensor 124. Because different lens diopters will result in different patterns of reflections, a detected pattern can be used to detect the diopter of the lens 150 attached to the electronic device 100. Exemplary diopters range from 0-9 or more for nearsightedness.

Figure 4:
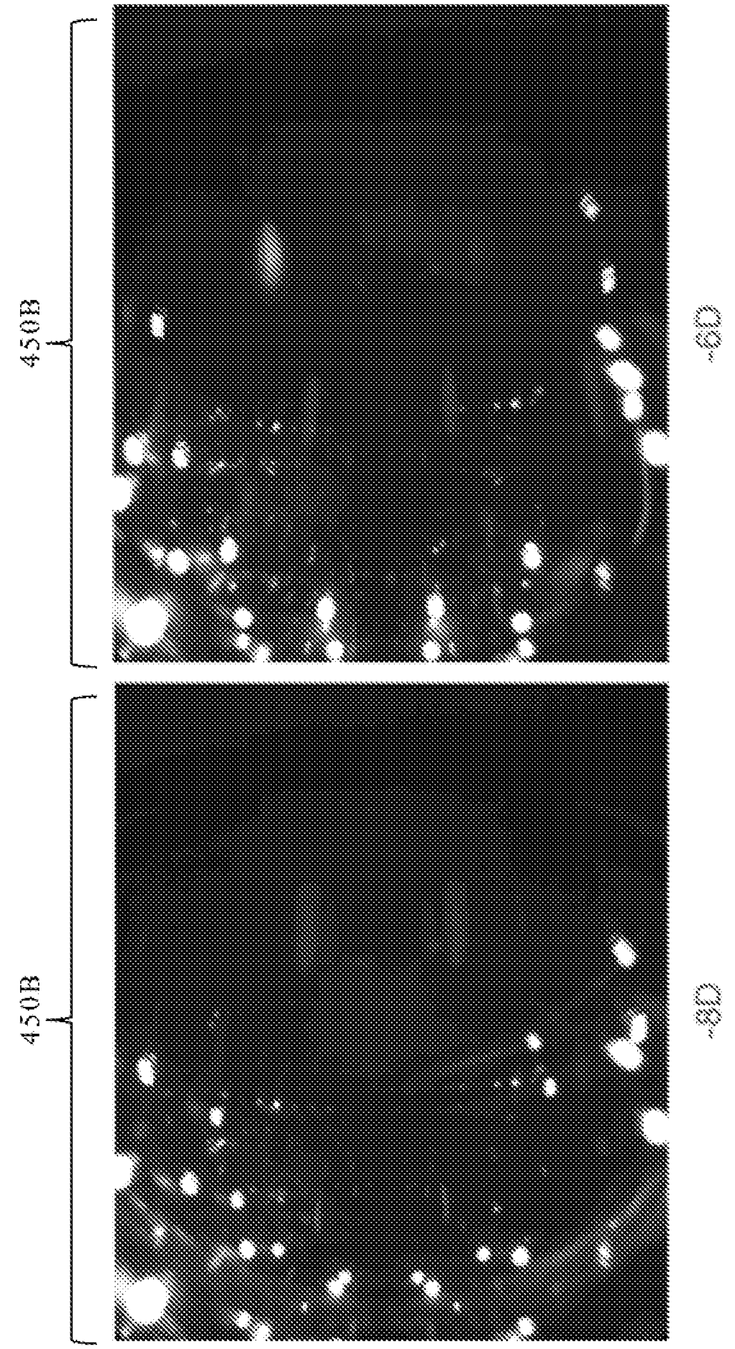
FIG. 4 is a diagram that shows two example images including reflections of light sources caused by an attachable lens in accordance with some implementations.

FIG. 4 is a diagram that shows two example images 450A, 450B, including patterns of light reflections off two different lenses having different diopters. As shown in FIG. 4, a first pattern of pairs of reflections caused by the light sources 122 are captured in an image 450A from the image sensor 124 for an example lens having a first diopter. A second different pattern of pairs of reflections caused by the light sources 122 are captured in an image 450B from the image sensor 124 for an example lens having a second different diopter. The light sources 122 and the image sensor 124 have the same configuration when the example images 450A, 450B are captured.

In some implementations, the pattern of the reflections (e.g., arrangement of pairs of reflections) used to determine the lens characteristic (e.g., diopter) of the lens 150 is based on a center point or a centroid of each of the reflections. The pattern may be detected based on positions and shapes of the reflections in one or more images. In some implementations, the pattern may be detected based on positions, intensities, and shapes of the reflections in one or more images.

In some implementations, an algorithm or machine learning (ML) model is used to determine the diopter (e.g., prescription) of a lens attached to an electronic device. A ML model can be trained using ground truth images (e.g., simulated or actual) generated for a specific device configuration, e.g., a specific arrangement of known light sources (e.g., type, intensity, position, orientation, etc.), a specific image sensor (e.g., type, position, orientation, resolution, etc.), and a specific lens (e.g., type, material, shape, etc.). Ground truth images for a range of lens characteristics (e.g., diopters) may be used to train the ML network. Once trained, one or more images of an attached lens is input to the ML network and the corresponding determined lens characteristic is output. In some implementations, the ML network is trained to output the lens characteristic and a corresponding confidence measurement. The ML model can be, but is not limited to being, a deep neural network (DNN), an encoder/decoder neural network, a convolutional neural network (CNN), or a generative adversarial neural network (GANN).

In some implementations, the 3D spatial arrangement between the light sources 122 and the image sensor 124 is known or predetermined (e.g., based on factory calibration). Further, a nominal position of the lens 150 can be estimated and then used to determine the actual pose (e.g., 3D position and orientation) of the lens 150. The accuracy of the lens characteristic determination may be improved by using actual (e.g., measured rather than general device configuration data) information about the spatial arrangement between the light sources 122, the image sensor 124, and the lens 150. A device configuration assessment may be based on assigning each reflection in the pattern to a respective light source of the light sources 122 and a front surface or a back surface of the lens 150.

In some implementations, the actual position and/or orientation of the lens 150 may be determined based on information about the device and reflections off the lens 150. The actual position and/or orientation of the lens 150 may be determined based on the position and/or orientations of the light sources 122 and of the image sensor 124. The actual position and/or orientation of the lens 150 may be determined based on the optical elements in the imaging system (e.g., a factory calibration). The actual position and/or orientation of the lens 150 may be determined based on determining a light path or light ray tracing between each of the light sources 122 reflected by front/back surfaces of the lens 150 to the image sensor 124. In other words, because the pattern of reflections occurs in the 2D image space of the image sensor 124, and the 3D information of the image sensor 124 and the light sources 122 is known, known techniques such as cost functions, best fit estimations, etc. can be used to determine the actual position and/or orientation of the lens 150. The reflections can be used to determine when the lens 150 is estimated to be at its intended position and/or orientation or deviates from that intended position and/or orientation by an error amount based on a backward ray tracking technique. Such a technique may involve performing ray tracing back from the image sensor 124 and assessing whether and how closely the ray intersects with a corresponding light source. A distance (e.g., minimal spatial distance) from the projected ray to the corresponding light source can be used to determine an error for that reflection. In some implementations, the overall error for all the reflections traced back to their corresponding light source is assessed (e.g., best fit estimation) to determine the actual position and/or orientation of the lens 150. In some implementations, the actual position and/or orientation calculation for the lens is used to increase the accuracy of the lens characteristic (e.g., diopter) determination of the lens 150. In some implementations, the actual position and/or orientation calculation for the lens relative to the electronic device is used as an input in training the ML model to detect lens characteristics. In some implementations, the actual position and/or orientation calculation for the lens relative to the electronic device is used to modify an input image to the trained the ML model, for example, by adjusting the positions of reflections in the input image to correspond to the reflections that would have been captured given an intended device configuration.

In some implementations, the electronic device 100 uses the lens characteristic determined based on the pattern of reflections off surfaces of the lens 150 to adjust rendering processes for the display 110, for example, to reduce or correct distortion. In another example, minor displacements (e.g., to the right, left, up, or down) of the spatial positioning of the lens 150 can be identified from the pattern of reflection off the lens 150 and corrected using rendering processes of the display 110. Alternatively, a warning to re-attach the lens 150 can be provided when a large displacement (e.g., over a threshold) of the spatial positioning of the lens 150 is detected. In some implementations, the lens characteristic may be stored for future use.

In some implementations, a lens presence detection process determines whether lenses are mounted to the electronic device 100. The lens presence detection process can be performed once, repeatedly (e.g., periodically), or upon instruction (e.g., "please detect attached lenses"). In one example, the lens presence detection process is performed when the electronic device 100 is enabled, during initialization of the electronic device 100, or when the electronic device 100 is placed on the head of the user 115.

Figure 5B:
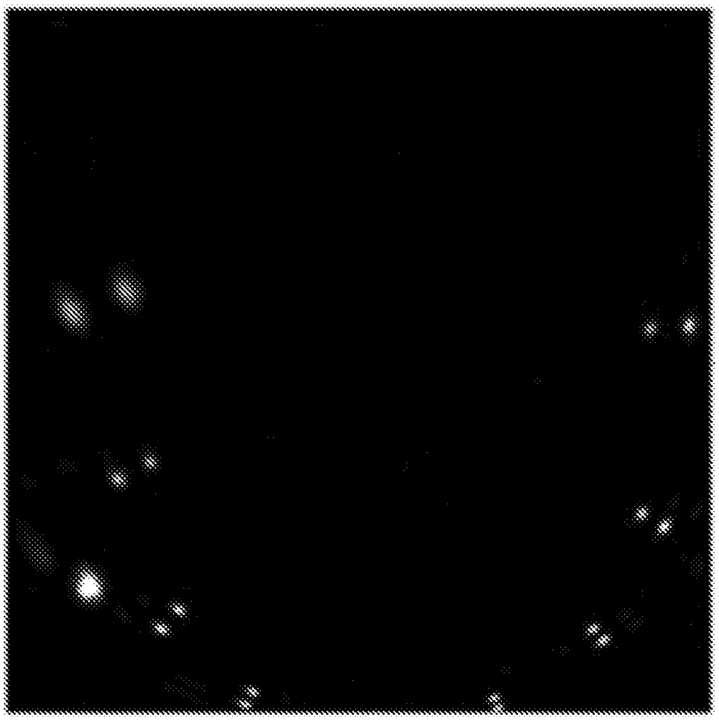
FIGS. 5A-5B are diagrams that shows example images captured during a attachable lens presence detection process in accordance with some implementations.
Figure 5A:
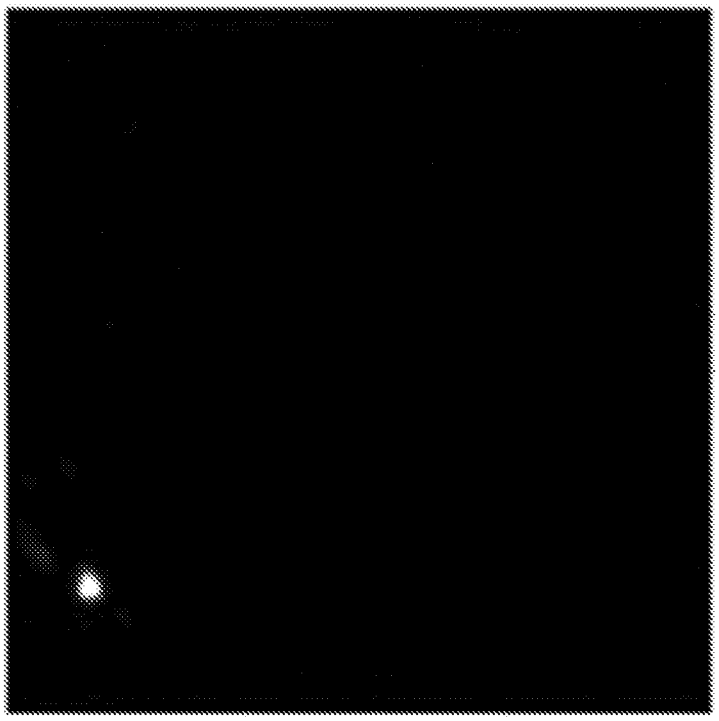

FIGS. 5A-5B are diagrams that show two example images captured during two lens presence detection processes. As shown in FIG. 5A, an image 550A captured by the image sensor 124 does not detect the presence of a lens in the electronic device 100. The image 550A in FIG. 5A may include static reflections 530 caused by other lenses or optical components in the imaging system. For example, the image in FIG. 5A corresponds to a factory calibration image characterized by the 3D spatial arrangement between the light sources 122, the image sensor 124, and other potential optical elements in between and without any lens.

In contrast, as shown in FIG. 5B, an image 550B captured by the image sensor 124 does detect the presence of a lens in the electronic device 100. The image in FIG. 5B includes a pattern of reflections (e.g., 8 pairs of reflections 520-1, 520-2, . . . , 520-8) caused an arrangement of 8 of the light sources 122 and the static reflections 530. Thus, based on a single image from the image sensor 124, the lens presence detection process determines whether a lens has been added to the calibrated light sources 122 and the image sensor 124. In some implementations, the lens presence detection process includes filtering based on static reflections or known component geometry.

In some implementations, in order to more accurately determine the diopter of an installed lens, the position and/or orientation of the installed lens is verified (e.g., calibrated to the imaging system (e.g., the light sources 122 and the image sensor 124). To correctly determine the position and/or orientation of the installed lens, the electronic device 100 may identify (i) which pair of reflections corresponds to which light source (e.g., light source assignment, FIG. 6), and (ii) a front surface reflection and a back surface reflection for each pair of reflections (e.g., lens surface assignment, FIG. 7).

In some implementations, the light source assignment is determined by turning on each light source of the light sources 122 one at a time and detecting the corresponding pair of reflections. It is to be appreciated that implementations are not limited to such configurations and that different number of light sources can be turned on to detect the corresponding pair of reflections. For instance, the light source assignment can be determined by turning on two light sources of the light sources 122 and detecting the corresponding two pairs of reflections.

Figure 6:
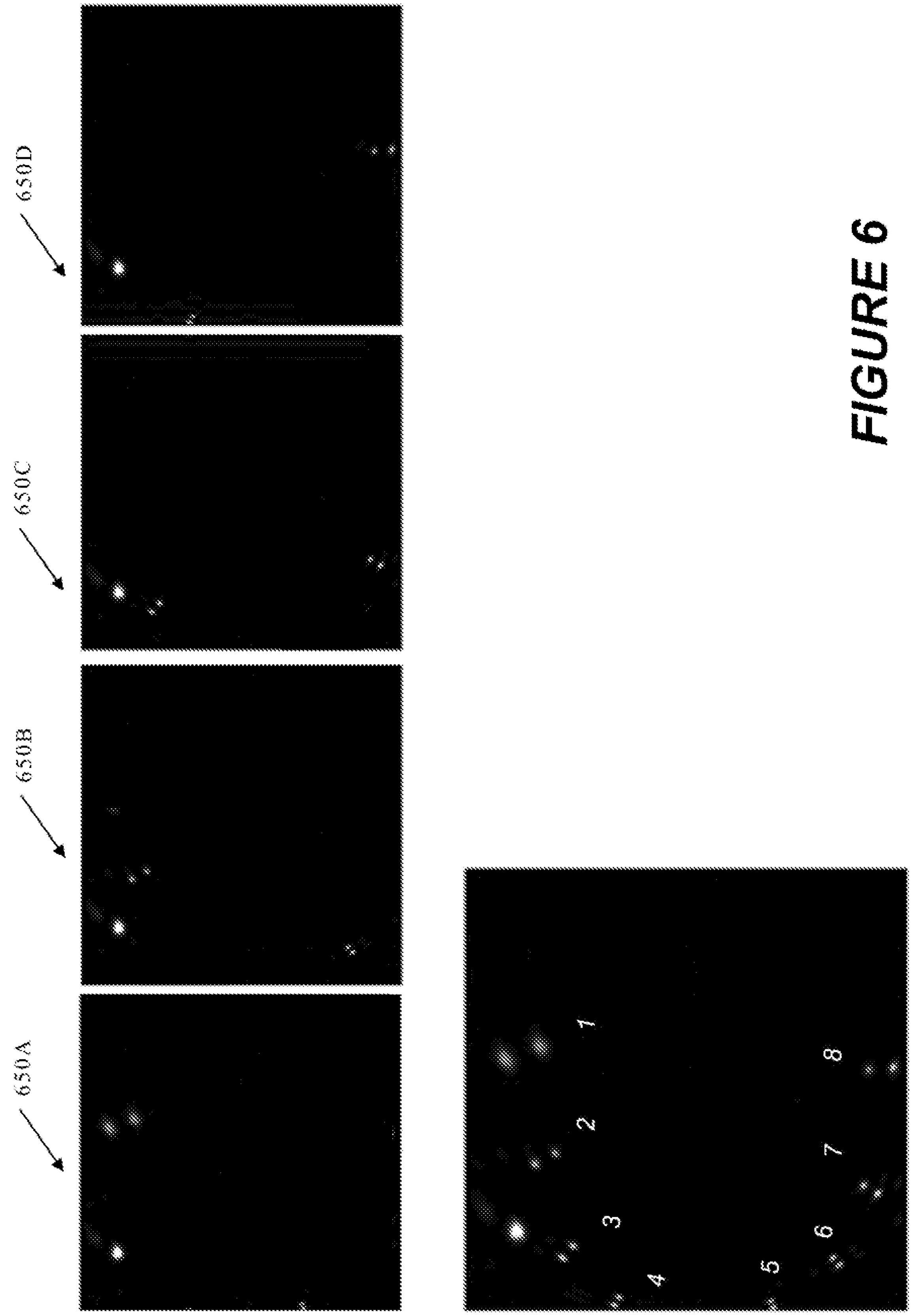
FIG. 6 is a diagram that shows example images captured during a light source assignment process in accordance with some implementations.

FIG. 6 is a diagram that shows images 650A-D captured during an example light source assignment process in accordance with some implementations. Each of images 650A-D is an image captured by the image sensor 124 when two of the light sources 122 from the arrangement of the 8 light sources 122 used in FIG. 5B are turned on. In some implementations, because the 3D spatial arrangement of the light sources 122 and the image sensor 124 is known, more than one of the light sources 122 can be selected and turned on so that the respective pairs of corresponding reflections do not overlap and/or maintain a minimal separation distance in the image under any diopter condition of the lens 150. The non-overlapping positioning and/or separation allows the system to more readily identify which pair of reflections correspond to which light source. For instance, as shown in FIG. 6, light source 1 and light source 5 of the light sources 122 are enabled when the image 650A is captured. Light source 2 and light source 6 of the light sources 122 are enabled when the image 650B is captured. Light source 3 and light source 7 of the light sources 122 are enabled when the image 650C is captured. Light source 4 and light source 8 of the light sources 122 are enabled when the image 650D is captured. In these images, none of the pairs of reflections are overlapping with one another.

In some implementations, the electronic device 100 determines a front surface reflection and a back surface reflection for each pair of reflections using a lens surface assignment process. The front surface assignment of reflections to the front surface and the back surface of the lens 150 may be used to determine the position of the installed lens 150 relative to the electronic device 100. In some implementations, the lens surface assignment process to assign the front surface of the lens 150 and the back surface of the lens 150 to each pair of reflections is determined based on direction, geometry, and/or distance (e.g., spatial proximity). In some implementations, the 3D spatial arrangement between the light sources 122, the image sensor 124, and a nominal position of an attached lens is used to simulate a pattern of reflections (e.g., simulated reflection positions) caused by the light sources 122 in an image of the image sensor 124. For example, the lens surface assignment calculates a first vector (from a first reflection to a second reflection of the pair of reflections) and a second vector (from the second reflection to the first reflection of the pair of reflections) for comparison to the simulated vector from the simulated back surface reflection to the simulated front surface reflection. Either the first vector or the second vector will match or correspond to the simulated vector and therefore may be used to correctly assign the front surface reflection and the back surface reflection for each pair of reflections in the pattern of reflections. When there is only a single reflection (e.g., not a pair of reflections), a spatial proximity comparison to the simulated reflection positions is used, and the closest simulated reflection position is paired with the single reflection. In some implementations, a lens surface assignment process includes filtering based on static reflections or known component geometry.

Figure 7:
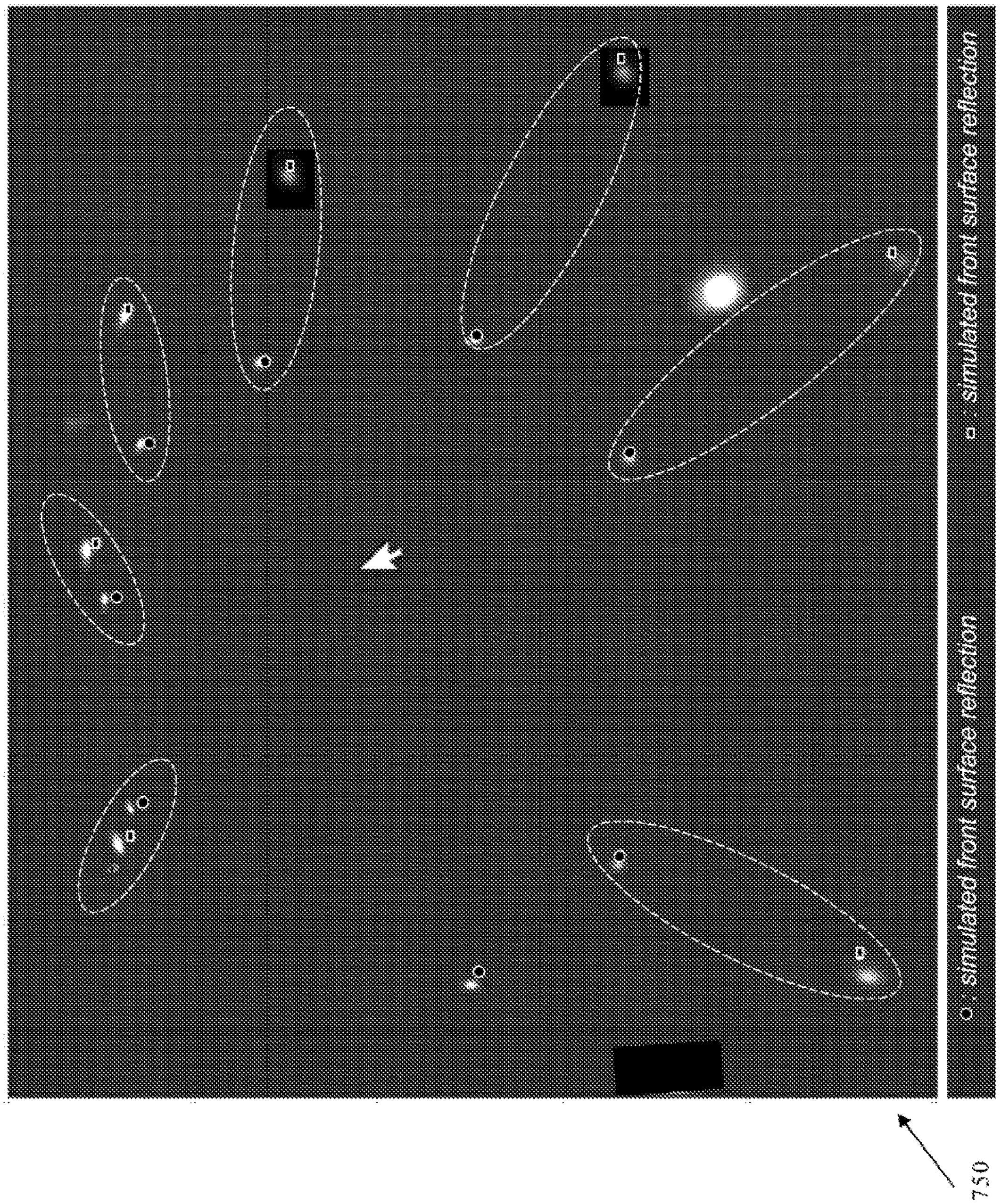
FIG. 7 is a diagram that shows an example image captured during a lens surface assignment process in accordance with some implementations.

FIG. 7 is a diagram that shows an example image captured during a lens surface assignment process in accordance with some implementations. As shown in FIG. 7, an image 750 from the image sensor 124 includes a pattern of reflections caused by 7 light sources 122 and the installed lens 150. As shown in FIG. 7, each pair of reflections determined by a previous light source assignment process is contained within a dashed white ellipse (e.g., based on the spatial arrangement between the 7 light sources 122, the image sensor 124, and a nominal position and/or orientation of the attached lens). The image 750 also includes simulated pattern of reflections including simulated reflection positions with simulated front surface reflections shown by a circle and simulated back surface reflections shown by a rectangle. As shown in FIG.

7, the simulated reflection positions are near but do not correctly or perfectly overlap the pairs of reflections 720-1, 720-2, . . . 720-6, but may be used to identify front surface reflections **720-1*a*, 720-2*a*, . . . 720-6*a* and back surface reflections 720-1*b*, 720-2*b*, . . . , 720-6*b* (e.g., simulated vector) and the single reflection 720-7*b* generated by the 7 light sources 122 reflecting off surfaces of the installed lens 150**.

Figure 8:
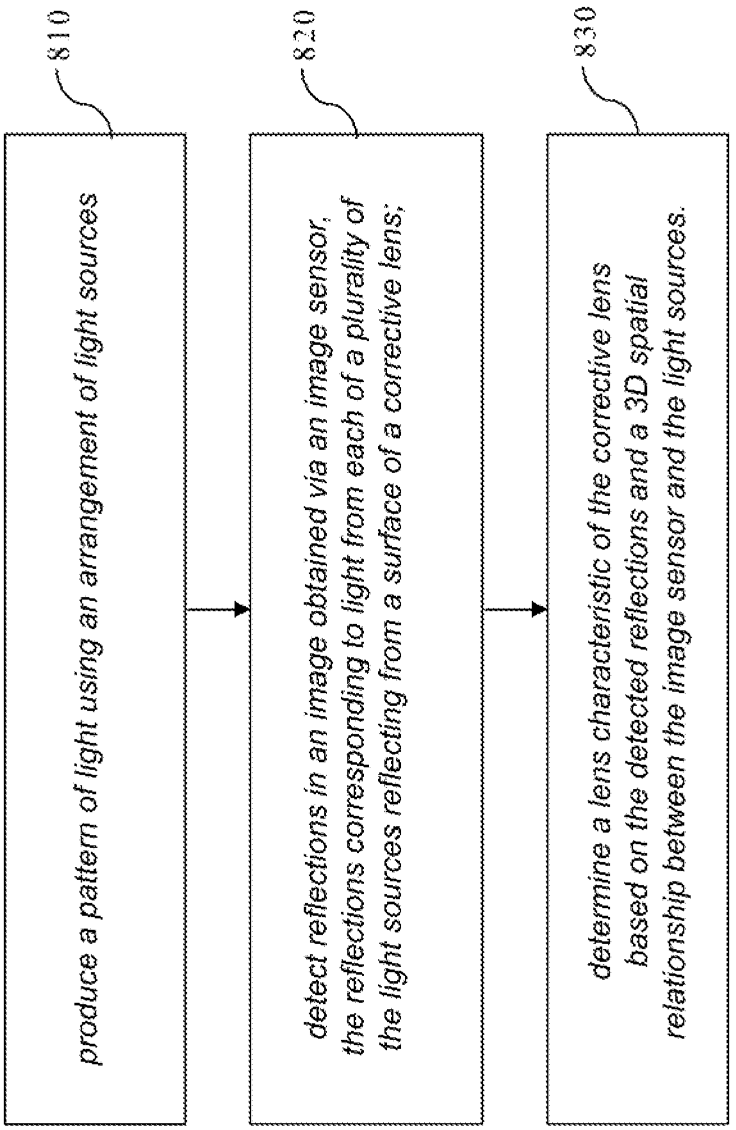
FIG. 8 is a flowchart illustrating an exemplary method that determines a lens characteristic of an attachable lens in an electronic device using reflections in an image of the attachable lens in accordance with some implementations.

FIG. 8 is a flowchart illustrating an exemplary method of determining a lens characteristic (e.g., prescription, position, orientation, etc.) of an attachable lens using reflections. For example, the attachable lens may be a corrective lens for an HMD and the lens characteristic may be prescription parameters of the corrective lens. In some implementations, an image sensor captures an image of the attachable lens including reflections caused by light being reflected from a front surface and a back surface of the lens. The light may be from a plurality of light sources (e.g., an arrangement of LEDs). Different diopters (e.g., prescriptions) of the attachable lens will generate distinct arrangements of the reflections. In some implementations, an algorithm or ML model inputs an image of the reflections and outputs the lens characteristic. In some implementations, the method 800 is performed by a device (e.g., electronic device 900 of FIG. 9). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the method 800 is performed by an electronic device having a processor.

At block 810, the method 800 produces a pattern of light using an arrangement of light sources. In some implementations, the light sources are IR lights arranged in an electronic device. The light sources may be in a 1D, 2D, or 3D arrangement.

At block 820, the method 800 detects reflections in an image obtained via an image sensor, the reflections corresponding to light from each of a plurality of the light sources reflecting from a surface of an attachable lens. In some implementations, the reflections are from a front surface of the attachable lens, back surface of the attachable lens, or both. In some implementations, the reflections in the image do not capture reflections of all of the light sources, but include reflections from a plurality of the light sources (e.g., to determine the lens characteristic). In some implementations, the electronic device is an HMD and the attachable lens is a corrective lens for the HMD. The corrective lens may be an insertable prescription lens, a removable prescription lens, a clip-on prescription lens, or the like.

In some implementations, the image may be one or more images, which each include a depiction of at least a portion of the attachable lens. In some implementations, the image sensor includes one or more image sensors that comprise a visible light image sensor, an IR image sensor, an NIR image sensor, and/or a UV image sensor. The image sensor may capture additional data such as depth data.

At block 830, the method 800 determines a lens characteristic of the attachable lens based on the detected reflections and a 3D spatial relationship between the image sensor and the plurality of light sources. In some implementations, the image sensor and arrangement of the light sources are located at fixed relative positions in the electronic device and the 3D spatial relationship is used to determine the lens characteristic based on the detected reflections. The light sources may be LEDs and the image may depict the light reflections from each LEDs that are caused by the LED light path from the LED source reflected from the front surface and the back surface of the attachable lens to intersect the image sensor. In some implementations, the lens characteristic may be (a) whether an attachable lens is attached or not, (b) a calculated attachable lens position and/or orientation in the electronic device, or (c) the attachable lens diopter.

In some implementations, the method 800 provides content at the electronic device based on the determined lens characteristic of the attachable lens, where the content is viewable through the attachable lens. In some implementations, providing the content may involve adapting the way the content is rendered based on the determined lens characteristic of the attachable lens. For example, providing the content based on the determined lens characteristic of the attachable lens may involve modifying a displayed image to compensate for lens distortion based on the attachable lens diopter. In another example, providing the content based on the determined lens characteristic of the attachable lens may validate the 3D position and/or orientation at which the attachable lens is attached within the electronic device.

In some implementations, the lens characteristic of the attachable lens is determined without interfering with a user's view of an extended reality (XR) environment (e.g., content) while using the electronic device. In some implementations, the lens characteristic of the attachable lens is determined each time the electronic device is enabled. In some implementations, the lens characteristic of the attachable lens is determined without interfering with eye tracking functionality implemented by the electronic device while the attachable lens is attached. In some implementations, the reflections and eye tracking information (e.g., glint) are detected in different portions of images obtained by the eye tracking image sensors.

In some implementations, blocks 810-830 are repeatedly performed. In some implementations, the techniques disclosed herein may be implemented on a smart phone, tablet, or a wearable device, such as an HMD having an optical see-through or opaque display.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 9:
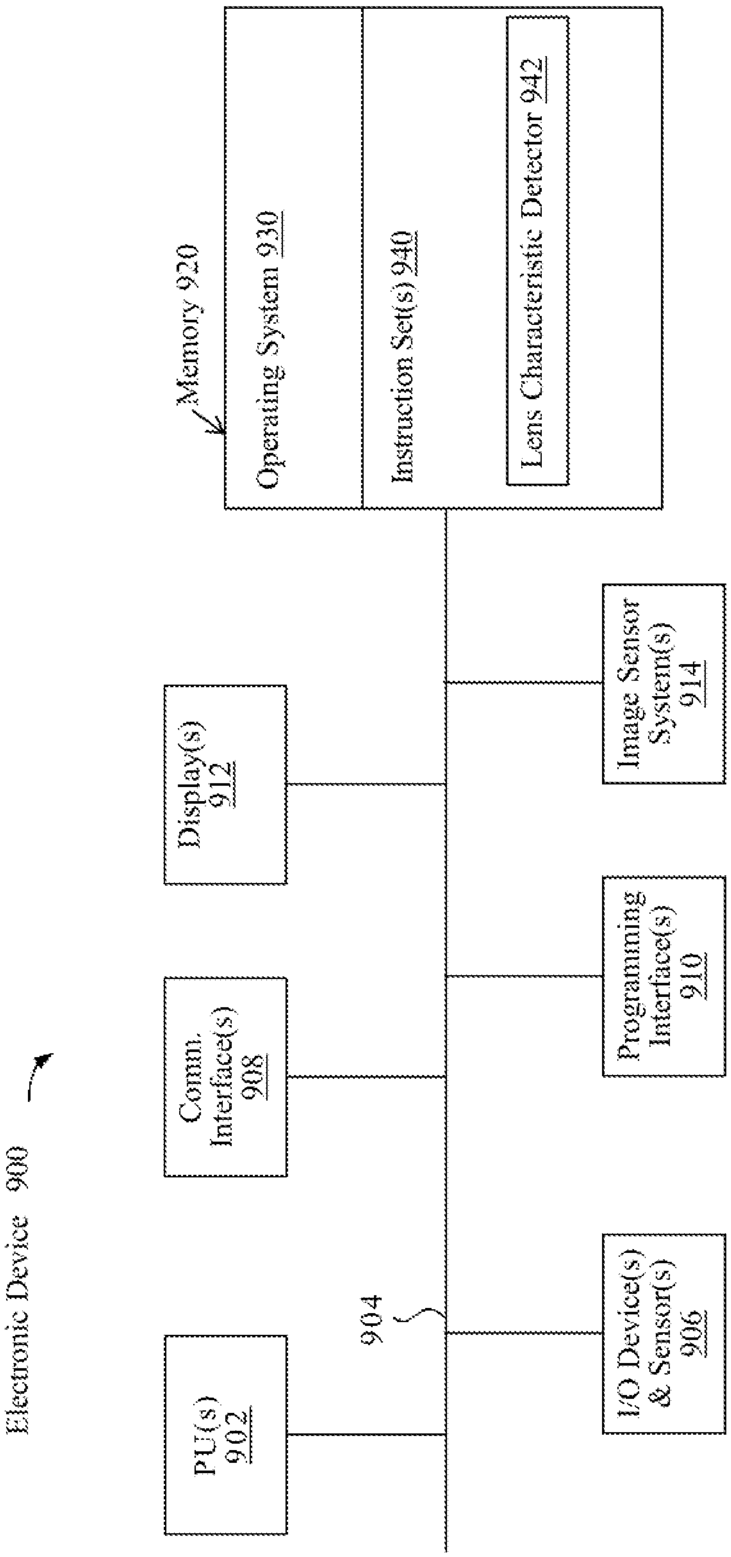
FIG. 9 illustrates an example electronic device in accordance with some implementations.

FIG. 9 is a block diagram of an example device 900. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 900 includes one or more processing units 902 (e.g., microprocessors, ASICs, FPGAs, GPUs, CPUs, processing cores, or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 910, one or more displays 912, one or more interior or exterior facing sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 912 are configured to present content to the user. In some implementations, the one or more displays 912 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 912 correspond to diffractive, reflective, polarized, holographic, etc. waveguide displays. For example, the electronic device 900 may include a single display. In another example, the electronic device 900 includes a display for each eye of the user.

In some implementations, the one or more interior or exterior facing sensor systems 914 include an image capture device or array that captures image data or an audio capture device or array (e.g., microphone) that captures audio data. The one or more image sensor systems 914 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 914 further include an illumination source that emits light such as a flash. In some implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

In some implementations, the instruction set(s) 940 include a lens characteristic detector 942 that is executable by the processing unit(s) 902 to detect a pattern of reflections off an attachable lens to determine one of more lens characteristics according to one or more of the techniques disclosed herein. For example, the lens characteristic may be a diopter for the attachable lens for an HMD.

Although the instruction set(s) 940 are shown as residing on a single device, it should be understood that in other implementations, any combination of the elements may be located in separate computing devices. FIG. 9 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor, an arrangement of light sources, and an image sensor:

producing a pattern of light using the arrangement of light sources;

detecting reflections in an image obtained via the image sensor, the reflections corresponding to light from each of a plurality of the light sources reflecting from a surface of an attachable lens; and determining a focusing strength of the attachable lens based on a detected pattern of the detected reflections and a 3D spatial relationship between the image sensor and the light sources, wherein different detected reflection patterns correspond to different focusing strengths of the attachable lens.

2. The method of claim 1, wherein the focusing strength is measured in diopters with respect to the attachable lens.

3. The method of claim 1, wherein the focusing strength corresponds to the position of the attachable lens.

4. The method of claim 1, wherein the focusing strength corresponds to a presence of the attachable lens.

5. The method of claim 1, wherein determining the focusing strength comprises assigning pairs of reflections in multiple images obtained via the image sensor to an individual light source of the light sources.

6. The method of claim 1, wherein determining the focusing strength comprises assigning a first pair of reflections and a second pair of reflections in images obtained via the image sensor to a first light source and a second light source, respectively, of the light sources.

7. The method of claim 6, wherein each pair of reflections is a front surface reflection from a front surface of the attachable lens and a back surface reflection from a back surface of the attachable lens.

8. The method of claim 6, wherein determining the focusing strength comprises assigning each of the light sources to a pair of reflections in each of multiple images obtained via the image sensor.

9. The method of claim 1, wherein determining the focusing strength comprises:

assigning each of the light sources to a pair of reflections in the image; and determining that a source of each of the reflections in each pair of reflections corresponds to reflection from a front surface or back surface of the attachable lens, wherein the focusing strength is determined based on the determined source of each of the reflections.

10. The method of claim 1, wherein the detected reflections in the image include a static reflection corresponding to light from at least one of the light sources reflecting from a surface of an additional optical component in the electronic device.

11. The method of claim 1, wherein at least one of the light sources and the image sensor are used for gaze tracking of a user of the electronic device.

12. The method of claim 1, wherein the focusing strength is determined via a machine learning model.

13. The method of claim 1, wherein the attachable lens is a corrective lens.

14. A system comprising:

memory; and one or more processors at a device coupled to the memory, wherein the memory comprises program instructions that, when executed on the one or more processors, cause the system to perform operations comprising:

producing a pattern of light using an arrangement of light sources;

detecting reflections in an image obtained via an image sensor, the reflections corresponding to light from each of a plurality of the light sources reflecting from a surface of an attachable lens; and determining a focusing strength of the attachable lens based on a detected pattern of the detected reflections and a 3D spatial relationship between the image sensor and the light sources, wherein different detected reflection patterns correspond to different focusing strengths of the attachable lens.

15. The system of claim 14, wherein the focusing strength is measured in diopters with respect to the attachable lens.

16. The system of claim 14, wherein the focusing strength corresponds to the position of the attachable lens.

17. The system of claim 14, wherein the focusing strength corresponds to a presence of the attachable lens.

18. The system of claim 14, wherein determining the focusing strength includes additional operations comprising:

assigning each of the light sources to a pair of reflections in the image; and determining that a source of each of the reflections in each pair of reflections corresponds to reflection from a front surface or a back surface of the attachable lens, wherein the focusing strength is determined based on the determined source of each of the reflections.

19. A non-transitory computer-readable storage medium, storing program instructions executable via one or more processors to perform operations comprising:

producing a pattern of light using an arrangement of light sources;

detecting reflections in an image obtained via an image sensor, the reflections corresponding to light from each of a plurality of the light sources reflecting from a surface of an attachable lens; and determining a focusing strength of the attachable lens based on a detected pattern of the detected reflections and a 3D spatial relationship between the image sensor and the light sources, wherein different detected reflection patterns correspond to different focusing strengths of the attachable lens.

20. The non-transitory computer-readable storage medium of claim 19, wherein determining the focusing strength includes additional operations comprising:

assigning each of the light sources to a pair of reflections in the image; and determining that a source of each of the reflections in each pair of reflections corresponds to reflection from a front surface or back surface of the attachable lens, wherein the focusing strength is determined based on the determined source of each of the reflections.

* * * * *